United States Patent Office

Re. 25,564
Reissued Apr. 28, 1964

25,564
LIGHTWEIGHT STRUCTURAL UNIT

Harvey E. Alford, Amherst, and Franklin Veatch, Cleveland, Ohio, assignors to The Standard Oil Company, Cleveland, Ohio, a corporation of Ohio No Drawing. Original No. 3,086,898, dated Apr. 23, 1963, Ser. No. 841,935, Sept. 24, 1959. Application for reissue Apr. 24, 1963, Ser. No. 275,809
1 Claim. (Cl. 161—168)

Matter enclosed in heavy brackets [ ] appears in the original patent but forms no part of this reissue specification; matter printed in italics indicates the additions made by reissue.

The present invention relates to lightweight, rigid, strong, structural units, such as structural panels or wallboards, consisting essentially of a mass of hollow, glass spherical particles bonded one to another without the requirement of a binder, and to the method of fabricating such a unit by sintering a moistened, shaped mass of said hollow glass particles within a critical temperature range.

The use of lightweight structural units has long been recognized to offer important advantages to those involved in the building trades due to the relative ease of handling such units during installation and to the savings appreciated in reduced costs of transportation. Furthermore, lightweight structural units often are essential for many applications, such as in the case of fabricating interior walls and partitions for ships and aircraft. For these reasons, many lightweight materials such as expanded perlitic materials, vermiculite, expanded mica, pumice, and the like, have been suggested by the prior art for incorporation into materials of construction such as concrete and gypsum plaster as fillers or as aggregate so that lightweight structural units such as panels, wallboards, siding, blocks, etc. could be made therefrom permitting much larger units to be handled by workers on a construction site with a commensurate reduction in installation time and cost. It has been found that a very desirable and unique material for use as a lightweight filler or aggregate in materials of construction is a mass of small, hollow, hole-free, spherical glass particles described in co-pending application Serial No. 691,726, now Patent No. 2,978,340, assigned to our assignee. These hollow glass particles have many inherently desirable properties in addition to their low density; and serve to improve the insulating and acoustical properties of lightweight concrete and plaster as well as providing superior moisture resistance and mechanical strength to such compositions.

In the past, however, the degree of improvement with the use of any of the above-mentioned lightweight materials has been limited because of the belief that a substantial amount of Portland cement of gypsum plaster binding agent must remain in the lightweight composition in order to obtain the desired strength characteristics for structural purposes. Obviously, the much higher density and relatively poor insulating value of these binding agents tends to offset to a great part the highly desirable properties of the desired lightweight material.

In accordance with the present invention, lightweight structural elements may be fabricated entirely from a mass of small, hollow glass particles such as described above so that the maximum advantage of their desirable properties may be appreciated in the final product without the requirement of a binder. Quite surprisingly, the structural units which may be prepared in this manner have strength characteristics which are superior, at equivalent densities, to conventional lightweight plasters and concretes.

The present invention introduces an entirely new and unique construction material to the building trade which will be highly desirable for many applications due to the combination of its low density and high strength. For example, with the use of structural units comprised of this material, load-bearing structural designs may be considerably reduced, both in capacity and in cost, in the fabrication of many structures such as interior walls or curtain-wall cores for exterior walls.

The small, hollow glass particles in the form contemplated for the present invention are prepared from discrete particles of feed which form a glass upon fusion thereof and a blowing agent in the manner described in co-pending application Serial No. 691,726, *now Patent No. 2,978,340*. The particles may be formed from any glass-forming components. A preferable feed material is disclosed as comprising a uniform mixture of sodium silicate as a primary component containing 2.5 to 25% boric acid and 0.8 to 5.0% urea by weight based on the silicate as anhydrous silicate. A typical product, for example, has particles within the size range of 10 to 350 microns, with an average diameter of 100 microns. The gas density of these particles depends primarily upon the relationship of the volume of the spheres to wall thickness. Generally, the density may be controlled within the range of 0.25 to 0.45 gram/cubic centimeter (cc.), but may range from 0.1 to 0.75 gram/cc. Wall thickness of these particles is surprisingly thin and may be expressed as a percentage of the diameter of the spheres, preferably being about 0.75 to 1.5% in particles having a size of 10 to 500 microns. For example, a sphere having a diameter of 350 microns and a gas density of 0.3 gram/cc. would have a wall thickness of 4 microns, a little more than 1% of the diameter. The preferred method and apparatus for the preparation of such particles is disclosed in co-pending application Serial No. 691,725, now Patent No. 2,978,339, assigned to our assignee. The description in both of these co-pending applications is incorporated herein by reference to the extent as may be required for the clear and complete understanding of these hollow glass particles.

In executing the invention, the mass of hollow glass particles is mixed with a small amount of water so that the resulting moistened mass becomes plastic and may be readily packed by hand or molded at low pressures into the desired shape of the structural unit. The damp structural unit is then heated at low temperatures on the order of 150 to 400° F. for a time to substantially dry the structure by removing the excess water. The final step of the process involves subjecting the dried but weak structure to considerably higher temperatures in the range of 1100 to 1200° F. for a time which is generally at least one-half hour so that the point of incipient fusion of the skins of the particles occurs, whereby the surfaces of the hollow particles become bound together by adhering one to another, resulting in the formation of a rigid, hard-surfaced material which is similar in appearance to plaster and which exhibits excellent strength characteristics.

The amount of water added to the mass of dry hollow glass spheres is not critical and merely need be an amount that is sufficient to render the mix plastic or flowable for handling for the molding step. Since it is necessary to remove this water in the subsequent heat treatment, it is preferable not to use any more water than is necessary. Generally the amount of water added to the mass of dry hollow particles will be in a volumetric ratio of from 1:100 to 1:2. Any means may be employed for forming or molding the moistened mass of hollow glass particles into the desired shape. A preferred means is compression molding at low pressures such as in the order of 50 lbs./sq. in. The heat treatment of the shaped unit may be carried out in one step by subjecting the unit to the desired high temperature range to bring about the desired hardening. It is, however, preferable to first drive off the excess water at low temperatures and then subject the dry but weak structure to a final heat treatment at high temperatures so that the hollow glass spheres adhere firmly one to another. To dry the mass of particles the temperature may be maintained in a range of from 150° to 450° F. for from 2 to 24 hours, depending upon the amount of water present in the moistened mass. During the drying step the moisture content is generally lowered to a range of from approximately 0.01 to 5.0%. Such range, however, is not to be considered critical. The temperature for the final heat treatment is critical to obtain the optimum desirable strength characteristics and has been found to be in a relatively narrow range of from 1100 to 1200° F. for a time of at least one-half hour.

It will be obvious from the above that the process of the invention for fabricating lightweight structural units such as panels or wallboards is quite simple and may be readily reduced to large scale commercial production. For example, after forming the moistened mass of hollow glass particles into panels or wallboards the entire heating operation could be carried out on a continuous basis by means of a moving belt passing through a heating chamber comprising zones of gradually increasing temperature.

The following working example illustrates the best mode contemplated for carrying out the invention.

A mass of hollow glass particles was mixed with water in a volumetric ratio of 22:1 until a plastic paste was obtained. The hollow glass particles had a bulk density of 0.35 gram/cc. and a side range of 10 to 300 microns, with an average diameter of 100 microns. These particles were formed from a feed material consisting of a mixture of sodium silicate, boric acid, and urea in the proportions of 40 parts sodium silicate $Na_2O(SiO_2)_{3.22}$, 5.6 parts of $H_3BO_3$, and one part urea (on a dry basis) and was prepared in accordance with the preferred embodiment of the previously mentioned co-pending application Serial No. 691,726. The moistened mass of glass particles was then placed in a mold and molded under a pressure of 50 lbs./sq. in. into a panel having the dimensions of 6" x 6" x ¾" thick. The panel was then heated in an oven under conditions of stepwise temperature increase to evaporate the excess water. The temperature schedule applied was 2 hours at 150° F., 2 hours at 200 °F., 4 hours at 300° F., and finally 8 hours at 400° F. The dry panel was then heated in a muffle furnace at a temperature of 1150° F. for one hour. The resulting panel was rigid with a hard, tough surface and was similar in appearance to gypsum plaster. It was found to be crack and chip resistant so that it could be sawed or nailed without cracking.

Several additional panels were prepared by repeating the procedure outlined above except that the temperature for the hour-long final heat treatment was varied from 900 to 1200° F. Still another panel was prepared in accordance with the above procedure except that the final heat treatment was conducted at 1100° F. for 4 days to determine the effect, if any, of longer heating times. Specimens were cut from each of these panels including the panel prepared in the preferred embodiment, and their strength characteristics are shown in Table I below as a function of the sintering temperature. The compressive strength tests and modulus of elasticity in compression tests were conducted on specimens measuring about ¾" x ¾" x 2" high on a Tinius-Olson Universal testing machine. The flexural or bending strength test and modulus of elasticity in bending tests were conducted on a sample beam measuring ½" x ½" x 6" long.

TABLE I

| Sintering Temperature, ° F. | Sintering Time (hrs.) | Compressive Strength (p.s.i.) | Modulus of Elasticity in Compression (p.s.i.) | Flexural Strength (p.s.i.) | Modulus of Elasticity in Bending (p.s.i.) |
|---|---|---|---|---|---|
| 1,150 | 1 | 2,180 | 120,000 | 493 | 364,000 |
| 1,200 | 1 | 811 | 42,100 | 433 | 167,000 |
| 900 | 1 | 92.7 | 2,660 | 28.1 | 17,500 |
| 1,100 | 1 | 1,250 | 80,000 | 200 | 165,000 |
| 1,100 | 96 | 1,280 | 84,000 | 230 | 174,000 |

It will be noted that the optimum value for all the strength perameters shown in Table I is obtained when the heat treatment is conducted at 1150° F. Clearly, it would be desirable to maintain the sintering temperature between 1100 to 1200° F. Sintering for periods of time in excess of one hour seems to offer little improvement in strength characteristics.

The compressive strength for a panel sintered at a temperature of 1150° F. is compared with strength data for conventional light-weight plasters and concretes at equivalent densities in Table II below.

TABLE II

| Material | Percent by Vol. Light-weight Material as Aggregate | Density, gm./cc. | Compressive Strength (p.s.i.) |
|---|---|---|---|
| Sintered board | 100% hollow glass particles. | 0.43 | 850 |
| Do | do | 0.53 | 1,250 |
| Light-weight Concrete | 83% expanded mica | 0.43 | 200 |
| Do | 78% expanded mica | 0.53 | 350 |
| Do | 92% expanded Volcanic Rock. | 0.43 | 100 |
| Do | 87% expanded Volcanic Rick. | 0.53 | 350 |
| Light-weight Plaster | 85% expanded Volcanic Rock· | 0.43 | 200 |
| Do | 80% expanded Volcanic Rock. | 0.53 | 250 |

It is apparent from the data reported in the above table that significant improvements in compressive strength is offered by the material of construction of the invention over conventional lightweight materials of construction. It is believed to be quite surprising that such strength characteristics can be appreciated without the use of any binder.

It is to be understood that various modifications of the present invention will suggest themselves to those skilled in the art. It is intended that all such modifications be included as may be defined by the appended claim.

We claim:

A strong, light-weight *structural unit* [structural wallboard] consisting of a rigid *shaped* mass of hollow, unicellular, glass, spherical particles fused to each other at their points of contact, said particles having diameters within the range of from about 10 to 350 microns, wall thicknesses within the range of about 0.75 to 1.5% of their diameters and gas densities within the range of from 0.1 to 0.75 gm./cc.

(References on following page)

References Cited in the file of this patent or the original patent

UNITED STATES PATENTS

| | | |
|---|---|---|
| 1,627,245 | McIntosh | May 3, 1927 |
| 1,682,675 | Horsfield | Aug. 28, 1928 |
| 2,117,605 | Fowler et al. | May 17, 1938 |
| 2,136,096 | Benner et al. | Nov. 8, 1938 |
| 2,187,432 | Powers | Jan. 16, 1940 |
| 2,197,562 | Reinker | Apr. 16, 1940 |
| 2,255,236 | Willis | Sept. 9, 1941 |
| 2,299,374 | Bickford | Oct. 20, 1942 |
| 2,533,633 | Schott | Dec. 12, 1950 |
| 2,583,452 | Watts et al. | Jan. 22, 1952 |
| 2,866,298 | Babcock | Dec. 30, 1958 |
| 2,918,757 | Franci et al. | Dec. 29, 1959 |
| 3,030,215 | Veatch et al. | Apr. 17, 1962 |

FOREIGN PATENTS

| | | |
|---|---|---|
| 425,413 | Great Britain | Mar. 11, 1935 |